United States Patent [19]

Smith

[11] 4,012,775

[45] Mar. 15, 1977

[54] SYSTEM FOR STABILIZING CATHODE RAY TUBE OPERATION

[75] Inventor: Clyde Smith, North Salem, N.Y.

[73] Assignee: Thomson CSF Laboratories, Inc., Stamford, Conn.

[22] Filed: Apr. 28, 1975

[21] Appl. No.: 572,169

[52] U.S. Cl. .................................. 358/29; 358/171
[51] Int. Cl.² .......................................... H04N 9/12
[58] Field of Search ............ 358/29, 74; 178/7.3 R, 178/7.3 DC, 7.5 R, 7.5 DC

[56] References Cited

UNITED STATES PATENTS

| | | | |
|---|---|---|---|
| 3,479,449 | 11/1969 | Campbell | 358/29 |
| 3,602,642 | 8/1971 | Van Den Avoort et al. | 178/7.5 R |
| 3,612,756 | 10/1971 | Akatsu et al. | 358/74 |
| 3,735,029 | 3/1973 | Sunstein | 178/7.5 R |
| 3,855,614 | 12/1974 | Okada | 358/74 |
| 3,873,767 | 3/1975 | Okada et al. | 178/7.5 R |
| 3,898,381 | 8/1975 | Amsen et al. | 358/74 |

Primary Examiner—Richard Murray
Attorney, Agent, or Firm—Martin Novack

[57] ABSTRACT

The invention pertains to a video display apparatus which includes a cathode ray tube having at least one electron gun and means for deriving a source of excitatory voltage signal representative of picture information. In accordance with the invention there is provided a system for stabilizing the display intensity attributable to the electron gun comprising means coupling the source of voltage signal to the gun for generating a stabilized current in the gun, the level of current in the gun being substantially independent of variations in the operating characteristics of the gun. In the preferred embodiment of the invention a test signal is periodically applied at a predetermined level to the gun. A sampler samples the beam current of the gun during the test signal and generates a correction signal in accordance with the sample value. The correction signal is applied to the electron gun so as to stabilize its reference current level.

20 Claims, 7 Drawing Figures

SYSTEM FOR STABILIZING CATHODE RAY TUBE OPERATION

BACKGROUND OF THE INVENTION

This invention relates to improvements in video display apparatus and, more particularly, to a system for stabilizing the display intensity or "color temperature" of a cathode ray tube. The subject matter of this invention is related to subject matter disclosed in copending U.S. application Ser. No. 572,128 of C. W. Smith and R. H. McMann, filed of even date herewith and assigned to the same assignee.

Conventional television display systems employing kinescope cathode ray tubes are subject to performance degradation resulting from instabilities in the operating characteristics of the kinescope or the circuits which drive or bias the kinescope. Prior techniques have been developed which serve to stabilize the signals driving a kinescope. For example, the drive voltages applied to the cathodes of a color kinescope can be stabilized using a feedback scheme; e.g., circuitry which periodically senses the drive voltage at input "black" and "white" levels of operation and corrects for deviations from standard reference voltages by gain adjustment. DC voltages applied to the kinescope can also be stabilized by using precise voltage regulation techniques.

There remains, however, the recognized problem of kinescope electron gun drift which manifests itself as a drift in screen color temperature in a three gun color kinescope. As the electron guns age, their generated beam current per unit of applied voltage (which can be considered a transconductance function) varies, the variations being generally non-uniform in the three different guns. This is a cause of noticeable and undesirable drifts in the display screen color.

The major sources of drift are: aging or long term variations caused by a gradual decrease in cathode activity, not necessarily constant or uniform for each cathode; and cathode operating temperature. The relatively long term variations in emission are caused by filament voltage changes and heat build-up in the gun area, generally a function of how many hours a display tube has been operating. Dynamic heating of each gun depends on the ratio of gun currents drawn to provide the colored picture being instantaneously presented. For example, a long persisting mostly red field causes red gun current almost exclusively, thereby causing an unbalanced heating of the red cathode, which changes its emission characteristics to a different degree than the other cathodes, this change remaining until relative cooling occurs.

Cathode thermal current, $I_{th}$, is represented by the Dushman equation:

$$I_{th} = SA_0 T^2 e^{-b/T} \text{ amperes}$$

where S and $A_0$ are constants and $b_0$ = Dushman constant ≈ 11,600° for an oxide coated cathode.
The derivative of the natural logarithm of this equation gives the change in emission with respect to temperature change:

$$dI_{th}/I_{th} = 2 + (b_0/t)(dT/T)$$

The temperature of the CRT cathode is approximately 1,160° K, which yields $$(dI_{th}/I_{th}) = 12 dT/T$$

Typical ambient temperature variations, such as in a display monitor, are about 40° C, so that the net change of gun current is of the order of $$12 \cdot 40/1,160 \approx 40\%$$

Therefore, a 1° C change in cathode temperature yields about a 1% change in gun current, if the gun is fixed bias and not near cut-off.

It is an object of the present invention to provide a stabilizing system which overcomes the problems set forth.

SUMMARY OF THE INVENTION

The invention pertains to a video display apparatus which includes a cathode ray tube having at least one electron gun and means for deriving a source of excitatory voltage signal representative of picture information. In accordance with the invention there is provided a system for stabilizing the display intensity attributable to the electron gun comprising means coupling the source of voltage signal to the gun for generating a stabilized current in the gun, the level of current in the gun being substantially independent of variations in the operating characteristics of the gun.

In the preferred embodiment of the invention a test signal is periodically applied at a predetermined level to the electron gun. A sampler samples the beam current of the gun during the test signal and generates a correction signal in accordance with the sample value. The correction signal is applied to the gun so as to stabilize its reference current level.

Further features and advantages of the invention will become more readily apparent from the following detailed description when taken in conjunction with the accompanying drawings.

DESCRIPTION OF THE PREFERRED EMBODIMENTS

Figure 1:
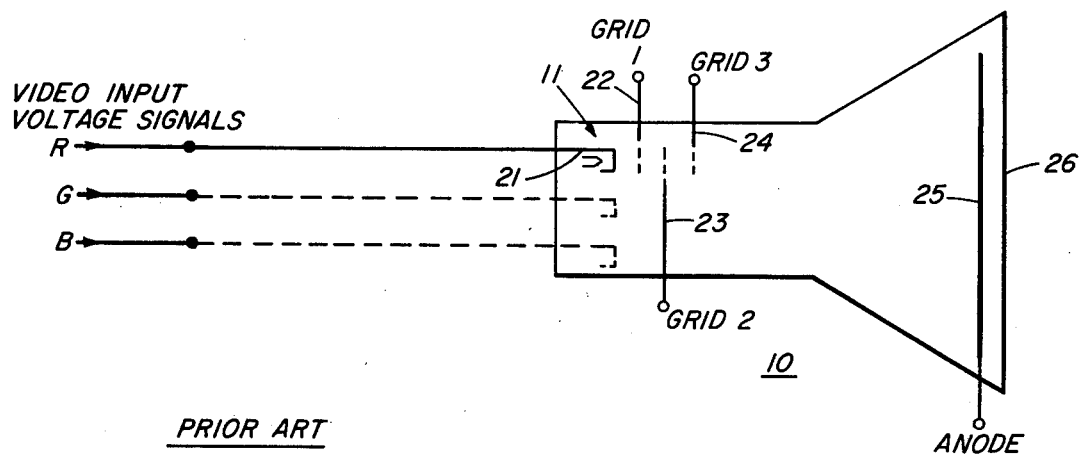
FIG. 1 is a simplified diagram of a color television display kinescope.

Referring to FIG. 1, there is shown a simplified diagram of a color television display cathode ray tube or kinescope 10 as driven by excitatory video voltage signals designated R, G and B, these signals having typical ranges of about 100 volts peak-to-peak. The kinescope 10 has three electron guns, each including a cathode and associated grids. For clarity of illustration, only one of the three guns, designated by reference numeral 11, is represented in some detail, but it will be appreciated that two other complete electron guns (indicated in the Figure by only the two dashed cathodes coupled to the G and B inputs) are normally provided and are substantially identical to the gun 11. Hereinafter, and in the description of the embodiments of the invention, the circuitry associated with only one electron gun in a given kinescope will be described for illustrative clarity, but it will be understood that if the kinescope has two or more guns, similar circuitry can be employed in conjunction with the remaining guns.

The electron gun 11 comprises a cathode 21 and first, second and third grids, 22, 23, and 24, which are sometimes designated as "grid 1," "grid 2," and "grid 3," or as the "control electrode," the "accelerating electrode," and the "focusing electrode," respectively. Generated electrons impinge on an anode 25 near display screen 26 which is coated with an electron-sensitive phosphor as is conventional in the art. Typical voltages applied to the cathode, grid 1, grid 2, grid 3 and the anode are about 235 volts, 150 volts, 700 volts, 5000 volts and 25,000 volts, respectively. In alternate modes of operation, the excitatory voltage input signal may be applied to a control grid with the remaining grid and cathode voltages being set at appropriate values.

Figure 2A:
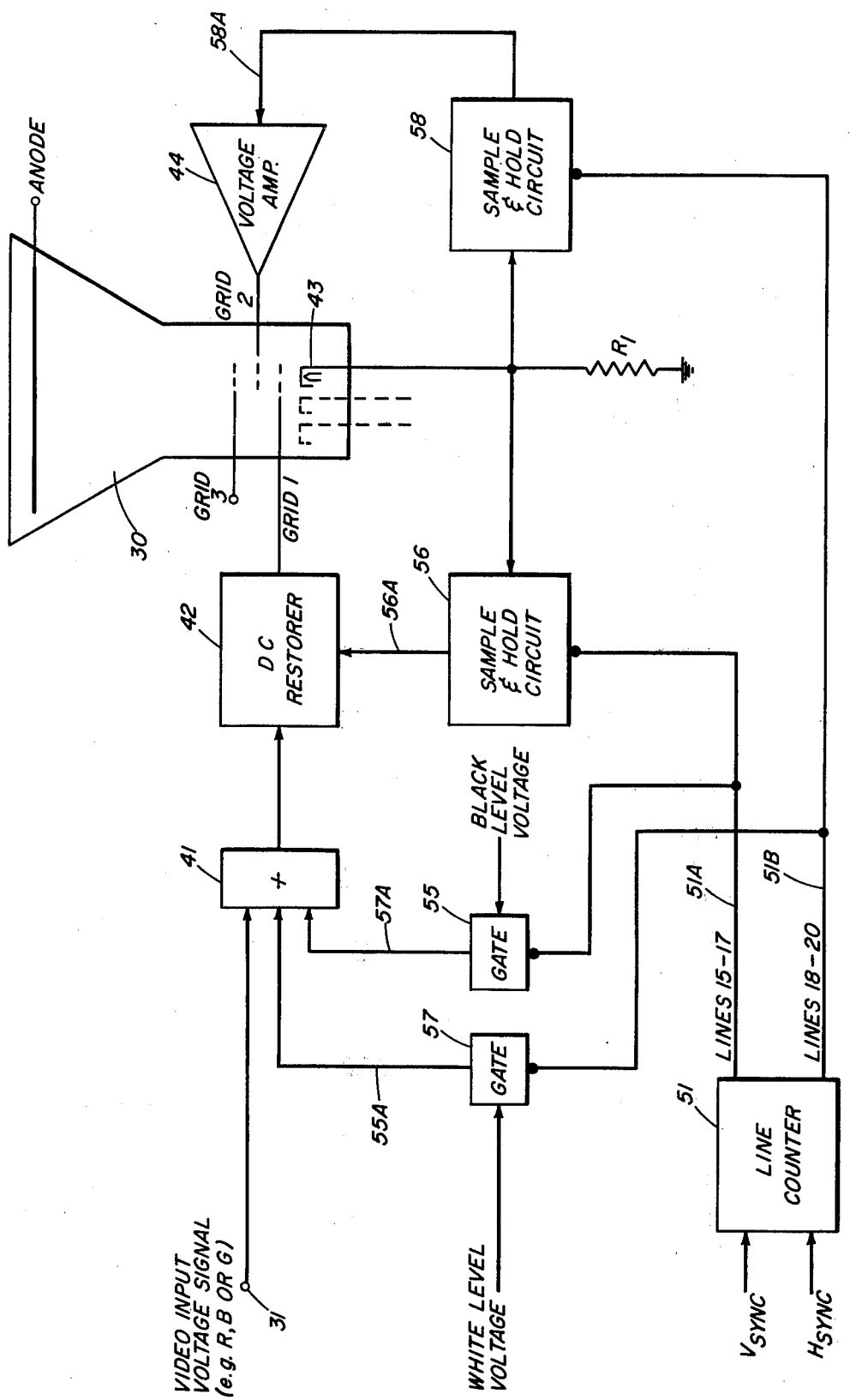
FIGS. 2A, 2B and 2C are block diagrams of embodiments of the invention which utilize periodically applied test signals.

Referring to FIG. 2A, there is shown an embodiment of the invention which comprises a system for stabilizing the display intensity or "color temperature" of the electron guns in a kinescope 30. An excitatory voltage signal at input terminal 31, which may be the R, B or G signal in a color system or the luminance signal in a black and white system, is coupled through an adder 41 and DC restorer circuit 42 to grid 1 of the kinescope 30. Cathode 43 is coupled through a resistor $R_1$ to ground reference. A bias voltage is applied to grid 2 via a voltage amplifier 44 which receives a signal on a line 58A which determines the level of the bias voltage applied to grid 2. Suitable focus and anode voltages are applied to grid 3 and the anode from sources not shown.

The vertical and horizontal synchronizing signals of the composite television signal, available in the television receiver, are applied to a line counter 51 which is adapted to count horizontal scanlines of the television field and to be reset to zero at the end of each television field. The counter generates a first output on a line 51A during the scanlines 15–17 of each television field and a signal on line 51B during lines 18–20 of each television field, all of the lines 15–20 occuring during the vertical blanking period. The signal on line 51A enables a gate 55 and also enables a sample-and-hold circuit 56. The signal on line 51B enables a gate 57 and a sample-and-hold circuit 58. The gates 55 and 57 respectively receive voltages at reference "black level" and "white level." The outputs of gates 55 and 57 are coupled over lines 55A and 57A, respectively, to inputs of the adder 41.

Operation of the system of FIG. 2A is as follows: During lines 15–17 of the vertical blanking interval the gate 55 is enabled so that black level voltage is coupled through adder 41 and circuit 42 to grid 1. With this voltage applied to grid 1 the cathode current should ideally have a certain nominal value that does not vary with the tube life or cathode temperature but, as indicated above in the Background, this is not generally the case in actual practice. The actual cathode current is sampled across resistor $R_1$, and a voltage representative of this current is coupled to the sample-and-hold circuit 56 which is enabled to sample the voltage across resistor $R_1$ during the lines 15–17. The circuit 56 holds the sampled voltage through the subsequent video field and couples the held voltage to circuit 42 via line 56A, this voltage serving to adjust the DC reference level of the output of circuit 42. In this manner, the voltage on line 56A controls the bias level at grid 1 so as to correct for any variations in the cathode current at nominal black level. Thus, for example, if at some point in operation the cathode current for a black level input voltage is lower than its nominal value, the voltage drop across sampling resistor $R_1$ will also be low. This will decrease the output of sample-and-hold circuit 56 fed to circuit 42 which, in turn, will cause the bias level at grid 1 to decrease (typically, to a less negative value with respect to the cathode). A lesser negative bias level on the control grid 1 will, in turn, cause a proportionate increase in the electron current flowing from cathode 43; the desired result.

Similarly, during lines 18–20 of the vertical blanking period white level voltage is applied via adder 41 and amplifier 42 to grid 1, and during this time the cathode current is sampled by circuit 58 which is enabled to sample by the signal on line 51B. During the remainder of the television field, the bias voltage applied to grid 2, via voltage amplifier 33, is a function of the voltage which had been sampled by circuit 58. For example, in an instance where the cathode current sensed at a white level voltage input is lower than the nominal value, the resultant low voltage sampled by circuit 58 will cause the grid 2 accelerating voltage to decrease. This causes the sampled voltage at black level to appear too negative (when next sampled during the succeeding vertical blanking interval) which, in turn, results in a decrease in grid bias by the black level circuit causing the desired increase in beam current over prior conditions, as previously described.

Figure 2B:
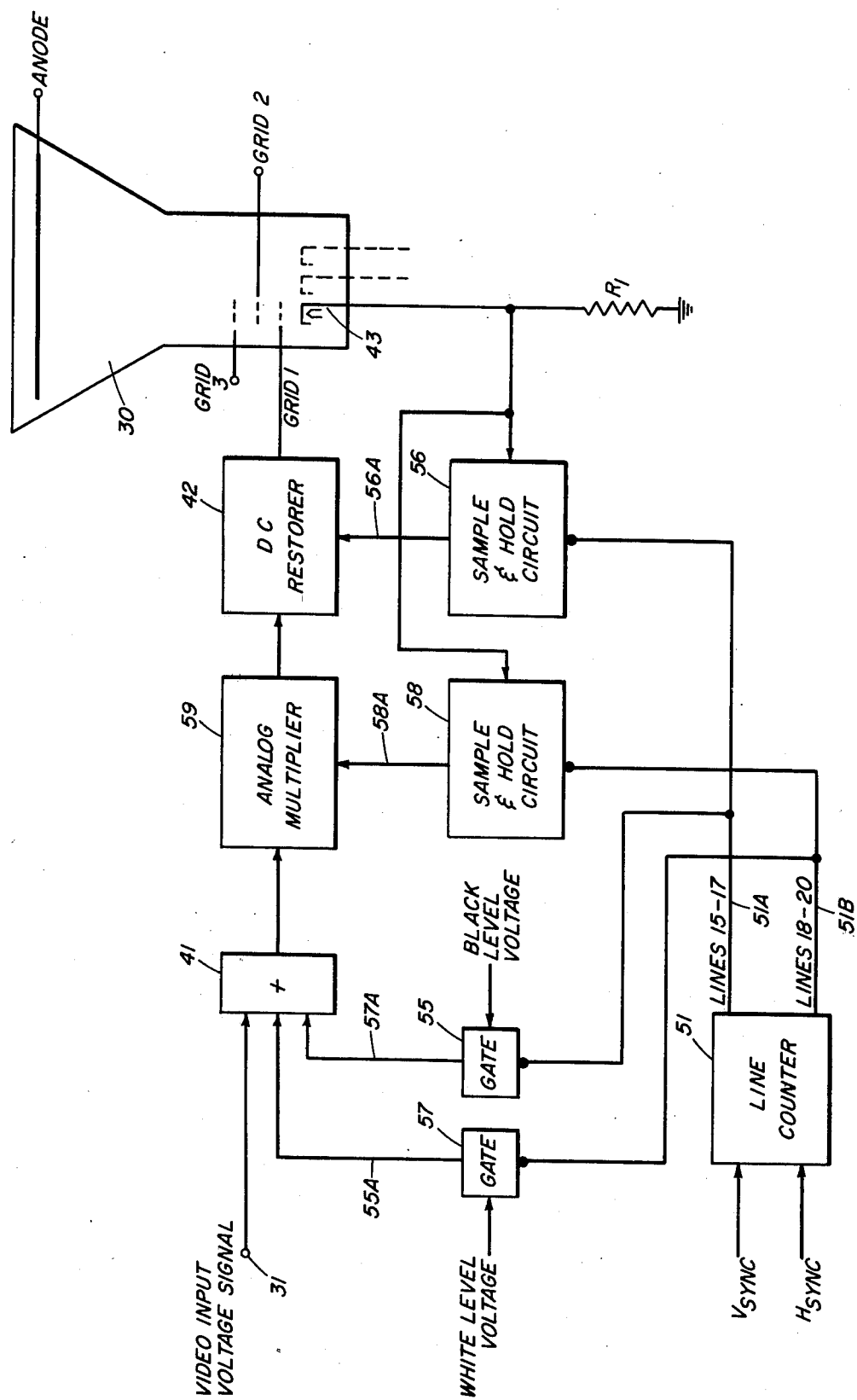

The embodiment of FIG. 2B is similar to that of FIG. 2A except that the output of sample-and-hold circuit 58 (which is a measure of the sampled white level current) is coupled to an analog multiplier circuit 59, which is in series with DC restorer circuit 52. In this embodiment, corrections resulting from both the white level and black level measurements are achieved via grid 1, with operation otherwise being substantially as described above.

Figure 2C:
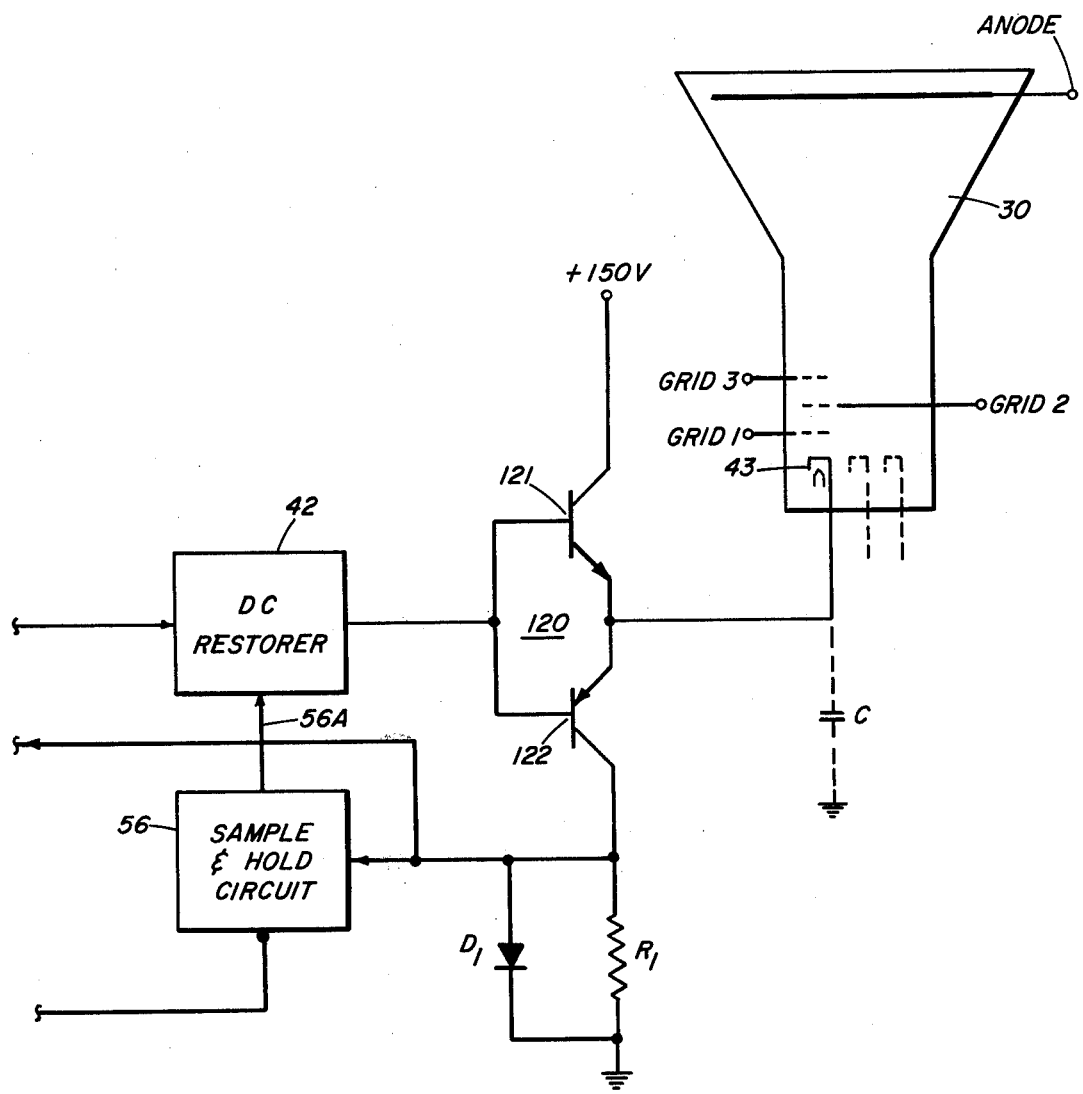

In the embodiment of FIG. 2C the electron gun is driven by application of the video signal to the cathode 43 via a complementary emitter-follower 120 which comprises NPN transistor 121 and PNP transistor 122. (The system to the left of blocks 42 and 56 is the same as in FIG. 2B). The transistor emitters are coupled to the cathode 43 of kinescope 30 and the transistor bases receive the video signal from DC restorer circuit 42. The collector of transistor 121 is coupled to a suitable bias voltage, e.g., 150 volts, and the collector of transistor 122 is coupled to ground reference potential through sampling resistor $R_1$.

In operation, during the lines 15–20 the test signals are applied via circuit 42 and cathode 43 is driven while the cathode current is sampled by resistor $R_1$, a typical value for which is 1K ohm. Transistor 122 is "on" during the white level test signal (output of circuit 42 about 25 volts) and the black level test signal (output of circuit 42 about 125 volts), and the gun current-representative voltages sampled across resistor $R_1$ are coupled to the appropriate sample-and-hold circuits as previously described. During the active portion of the television field the analog multiplier 59 and DC restorer circuit 42 apply appropriate corrections, with transistor 122 normally "on." During rapid lighter-to-darker transitions of the video signal the transistor 121 turns momentarily "on" and the tube capacitance and stray capacitance (collectively represented by C in the Figure can be thought of as charging. Diode $D_1$ prevents inordinate voltage drops across $R_1$ during the active picture area when $R_1$ is not used for sampling.

Figure 3:
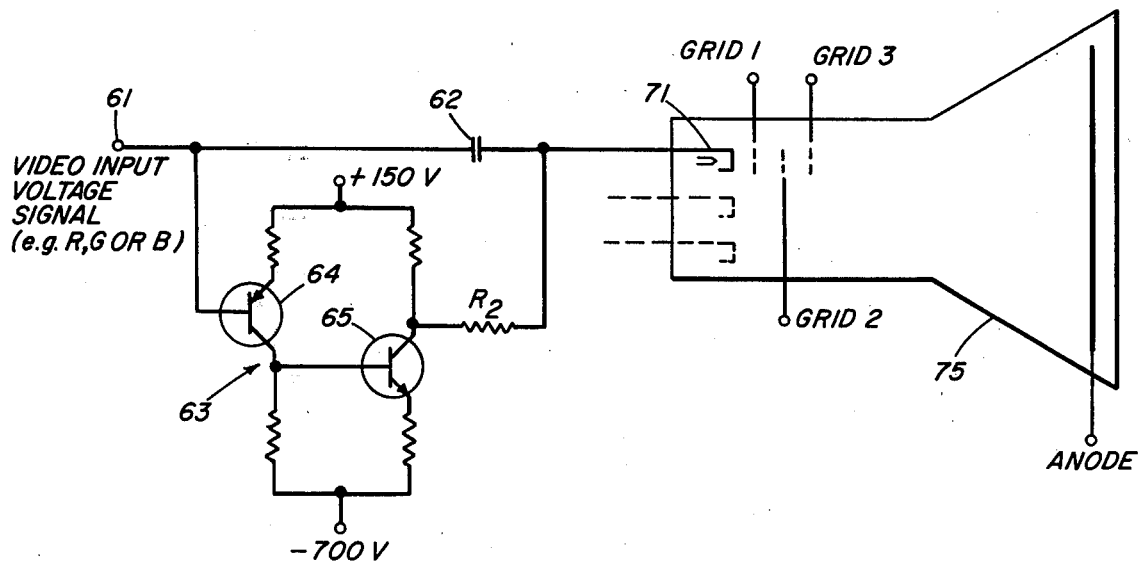
FIG. 3 is a schematic representation of an embodiment of the invention which employs a "constant current" technique.

In the embodiment of FIG. 3 the video voltage signal at terminal 61 is coupled to cathode 71 of a kinescope 75 by the parallel combination of capacitor 62 and amplifier 63 in a series with resistor $R_2$. Amplifier 63 comprises transistors 64 and 65 and has a voltage gain of about 5 and an output capability of about 500 volts. The resistor $R_2$ is selected to be substantially greater than the input impedance of the cathode 71 and preferably has a resistance at least five times higher than the cathode resistance. Since the effective cathode resistance is the inverse of the gun transconductance (about 8.6 micromhos), a suitable value for $R_2$ is of the order of 600K ohms. Accordingly, the amplifier 63 in conjunction with resistor $R_2$ operates as a so-called "constant current" source, which effectively transforms the voltage signal at terminal signal to a current source input to the cathode 71, this current source input being relatively insensitive to variations in the kinescope characteristics. Since normal wiring capacitance and electron gun interelectrode capacitance render high frequency response impractical in a high impedance amplifier drive, the higher frequency portions of the video signal are shunted across the amplifier by capacitor 62 which may have a typical value of about 0.05 microfarads. The higher frequency signals arrive at substantially the same relative level as the low frequencies, thereby preserving their relationship. This is because the lower frequency signals are amplified by a factor of 5 and then undergo a one-fifth loss by virtue of the voltage divider action of resistor $R_2$ and the cathode impedance.

Figure 4:
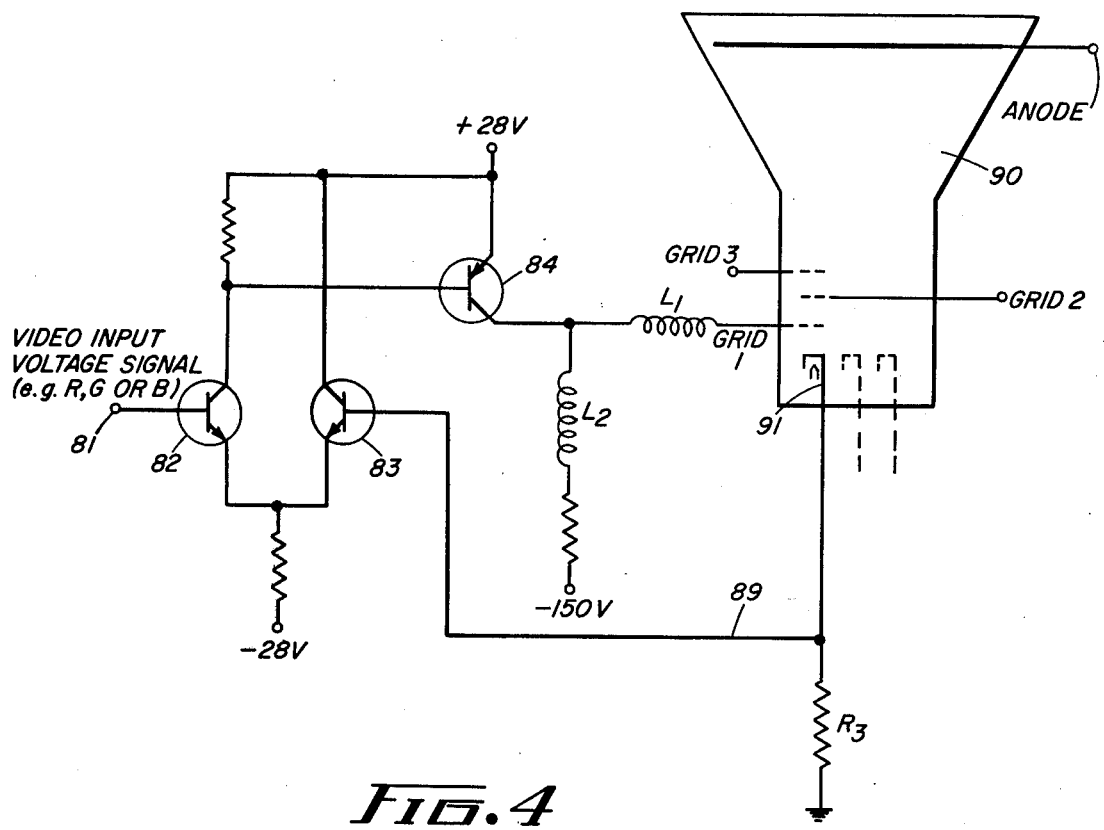
FIG. 4 is a schematic representation of another embodiment of the invention employing a differential amplifier.

FIG. 4 shows a further embodiment wherein the video voltage signal at an input terminal 81 is applied to one input of a differential amplifier comprising transistors 82, 83 and 84. The output stage 84 drives the grid 1 electrode of kinescope 90 through series peaking inductor $L_1$ and shunt peaking inductor $L_2$. The cathode 91 of kinescope 90 is coupled to ground reference potential through resistor $R_3$ which is used to continuously monitor the cathode current, the line 89 coupling a voltage representative of the cathode current to the other input of the differential amplifier; viz., the base of transistor 83.

In operation, the voltage developed across resistor $R_3$ is proportional to the cathode current. This voltage, for a stable transconductance, should be in a stable relationship with respect to input voltage at terminal 81, and $R_3$ is selected empirically at a value, typically about 2K ohms, which generates a sample voltage nominally equal to the input voltage at terminal 81. When a deviation exists between the inputs to transistors 82 and 83, the output of the differential amplifier adjusts up or down to correct for the difference, thereby adjusting control of the drive to grid 1 and correcting for drifts in the kinescope transconductance.

A characteristic of the circuit of FIG. 4 is that it linearizes the electron gun transfer function which normally is non-linear, the non-linear function conventionally being known as "gamma" of the kinescope. Television video signals are conventionally precorrected for the gamma of the kinescope. In a color kinescope the gamma may be different for each gun, making it difficult to match the effective light output attributable to each gun over the grey scale; a problem known as "tracking" in the prior art. The present invention allows use of an inverse gamma circuit (which eliminates the precorrection in the conventional television signal) and the linearized gun transfer functions reduce tracking problems.

Figure 5:
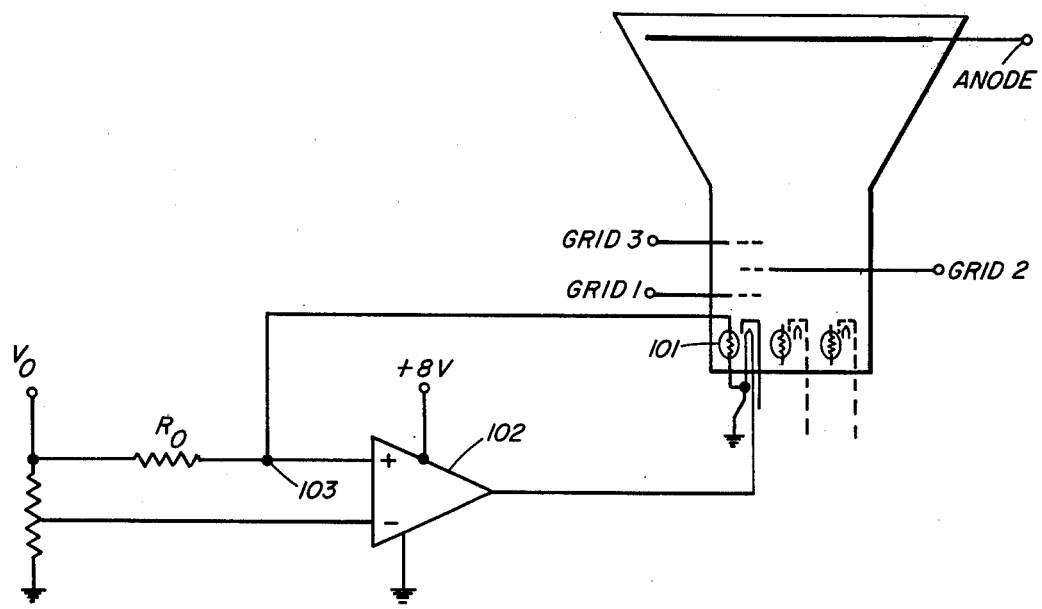
FIG. 5 is a schematic representation of another embodiment of the invention employing direct cathode temperature sensing and heater control.

The invention has been described with reference to particular embodiments, but it will be understood that variations within the spirit and scope of the invention will occur to those skilled in the art. For example, the circuits of the "constant current" generator of FIG. 3 or the differential amplifier of FIG. 4 may be of other suitable forms. Also, in the embodiment of FIG. 2, sampling could be achieved during any suitable blanking or active period. The beam could be deflected off the tube face during sampling time to avoid displaying the trace during this time. Finally, stabilization of cathode temperatures could be achieved directly, such as by providing heater/thermistor stabilization circuits for each cathode. A suitable circuit is shown in FIG. 5 wherein a negative temperature coefficient thermistor 101 is attached to the cathode metal. $V_0$ is a precision voltage source providing a voltage typically in the range 5–12 volts and $R_0$ is selected as being substantially equal to the resistance of the thermistor at nominal cathode temperature. If the cathode becomes unduly hot, the resistance of thermistor 101 will decrease which, in turn, causes the voltage at terminal 103 to decrease. This results in a decreased output of operational amplifier 102, so that the cathode heater drive is reduced, as desired. Insufficient cathode temperature can be seen to cause the opposite effect.

I claim:

1. In a television display apparatus which includes a cathode ray tube having at least one electron gun and means for applying a television video signal to said electron gun; a system for stabilizing the display intensity attributable to said electron gun, comprising:
   means for generating first and second test signals during the vertical blanking intervals of said television video signal;
   means for applying said first and second test signals to said electron gun during first and second portions, respectively, of said vertical blanking intervals;
   means for sampling the beam current of said electron gun during said first and second portions and for generating first and second correction signals, respectively, in accordance with the sampled values; and
   means for applying said first and second correction signals to said electron gun so as to stabilize the reference current level of said electron gun.

2. The system as defined by claim 1 wherein said first and second correction signals are applied to grids of said electron gun.

3. The system as defined by claim 2 wherein means are provided for maintaining the correction signals during the intervals between successive test signals.

4. The system as defined by claim 1 wherein means are provided for maintaining the correction signals during the intervals between the successive test signals.

5. The system as defined by claim 1 wherein said first and second test signals are at white and black level viedo, respectively.

6. The system as defined by claim 5 wherein said first correction signal is applied as a multiplying factor to said television video signal.

7. The system as defined by claim 6 wherein the corrected television video signal is applied to the control grid of said electron gun.

8. The system as defined by claim 6 wherein the corrected television video signal is applied to the cathode of said electron gun.

9. The system as defined by claim 6 wherein said second correction signal is applied as a DC reference level to the corrected television video signal.

10. The system as defined by claim 1 wherein said means for sampling the beam current comprises a resistor in series with the cathode of said gun.

11. In a video display apparatus which includes a cathode ray tube having a plurality of electron guns and means for applying a plurality of television video signals representative of color picture information to said electron guns; a system for balancing the color screen temperature of said cathode ray tube, comprising:
  means for generating first and second test signals during the vertical blanking intervals of said television video signal;
  means for applying said first and second test signals to said electron guns during first and second portions, respectively, of said vertical blanking intervals;
  means for sampling the beam current of each electron gun during said first and second portions and for generating first and second correction signals, respectively, for each electron gun in accordance with the sampled values; and
  means for applying said first and second correction signals to their respective electron guns so as to balance the screen color temperature of said cathode ray tube.

12. The system as defined by claim 11 wherein said first and second correction signals are applied to grids of said electron guns.

13. The system as defined by claim 12 wherein means are provided for maintaining the correction signals during the intervals between successive test signals.

14. The system as defined by claim 11 wherein means are provided for maintaining the correction signals during the intervals between successive test signals.

15. The system as defined by claim 11 wherein said first and second test signals are at white and black level video, respectively.

16. The system as defined by claim 15 wherein said first correction signal is applied as a multiplying factor to each of said plurality of television video signals.

17. The system as defined by claim 16 wherein the corrected plurality of television video signals are applied to the control grids of their respective electron guns.

18. The system as defined by claim 16 wherein the corrected plurality of television video signals are applied to the cathodes of their respective electron guns.

19. The system as defined by claim 16 wherein said second correction signals are applied as DC reference levels to the corrected television video signals.

20. The system as defined by claim 11 wherein said means for sampling the beam current comprises a plurality of resistors in series with the cathode of said electron guns.

* * * * *